Aug. 2, 1949.     J. HAMMOND     2,477,600
CHUCK
Filed Feb. 2, 1946
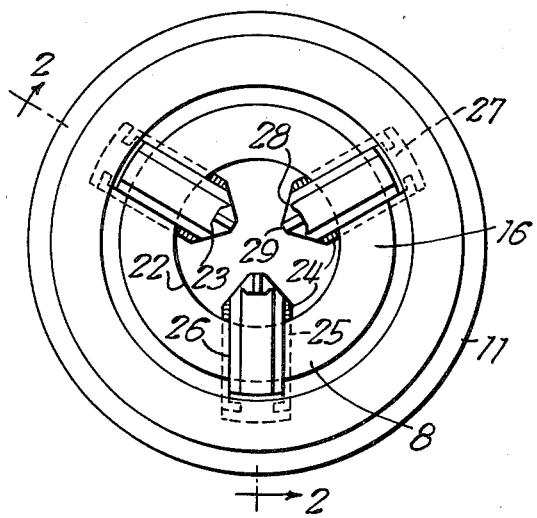
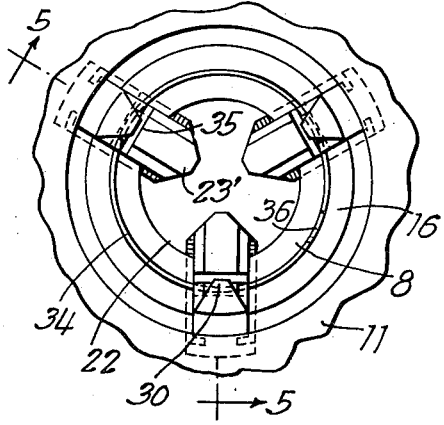
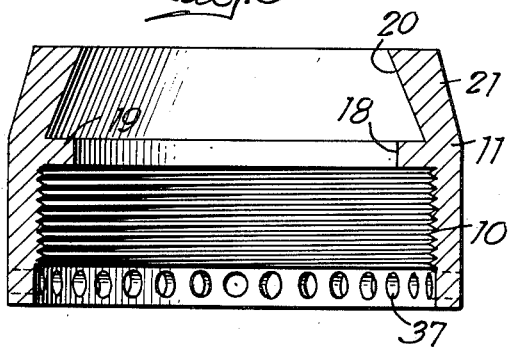
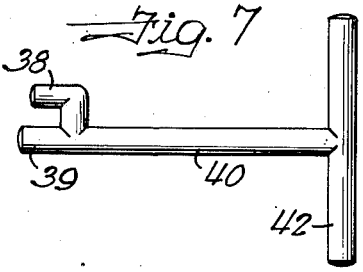
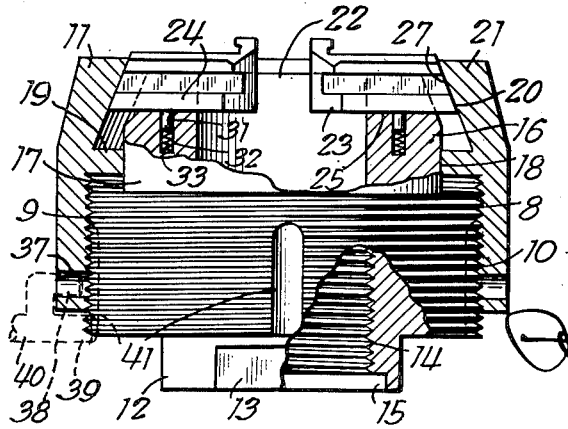
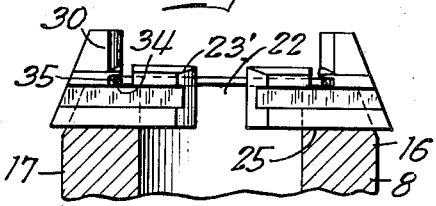
Inventor
Joseph Hammond
Andrew F. Wintercorn
atty.

Patented Aug. 2, 1949

2,477,600

UNITED STATES PATENT OFFICE 2,477,600

CHUCK

Joseph Hammond, Rockford, Ill.

Application February 2, 1946, Serial No. 645,100

6 Claims. (Cl. 279—56)

This invention relates to chucks and is more particularly concerned with larger sized chucks suitable for use on machine tool spindles.

The principal object of my invention is to provide a chuck of simple and practical design in which the jaws for gripping the work have a radial thrust transmitted thereto endwise with respect to the jaws for a better gripping action and more accurate centering of the work, the sleeve in which the taper is provided working on the beveled outer ends of the jaws also having an annular internal pilot flange fitting closely on a smooth cylindrical pilot end portion that is accurately made in concentric relation to the chuck body, whereby to insure the closest possible accuracy in the centering of the work when gripped between the jaws, the pilot flange serving the further purpose of excluding chips and dust from the threads on the interfitting body and sleeve parts.

Other objects and advantages of my invention will appear in the course of the following description in which reference is made to the accompanying drawing, wherein Fig. 1 is a face view of a chuck made in accordance with my invention;

Fig. 2 is a section on the broken line 2—2 of Fig. 1;

Fig. 3 is a section through the sleeve removed from the chuck;

Fig. 4 is a front view of another chuck having a modified or alternative form of jaws;

Fig. 5 is a sectional detail on the broken line 5—5 of Fig. 4 with the sleeve removed;

Fig. 6 is a developed view of the joint in the split spring ring of Figs. 4 and 5, and Fig. 7 is a view of the tightener key usable with the chucks of Figs. 1 and 4 as indicated in dotted lines in Fig. 2.

Similar reference numerals are applied to corresponding parts throughout these views.

Referring first to Figs. 1 to 3, the chuck body 8 is of stepped cylindrical form, the intermediate portion 9 being of largest diameter and threaded for threading engagement in the internal threads 10 in the rear portion of the sleeve 11. The rear end portion 12 of the body is of reduced diameter and smooth externally with suitable facets, as indicated at 13, to facilitate threading the body tightly onto a lathe spindle, for example, although, of course, the present chuck is designed for use on various machine tools. The internal threads 14 in the body are accurately made in concentric relation to the body so that the chuck will run true when the body is tightened on the spindle. The counterbore 15 in the rear end of the body receives a shouldered portion of the spindle against which the body may be properly tightened in the application of the chuck to the spindle. The front portion 16 is of an intermediate diameter and machined in truly concentric relation to the rest of the body with a smooth cylindrical pilot surface 17 for cooperation with the pilot bearing surface 18 on the inner circumference of an annular flange 19 provided in the sleeve 11 between the internally threaded rear end portion 10 and the tapered bore 20 in the front end portion 21. This pilot feature eliminates the slight inaccuracy there might otherwise be in the centering of the sleeve 11 with respect to the body 9 if the threaded connection at 9—10 were relied upon alone, and the pilot flange 19 serves the further important function of excluding chips and dust from the threads 9—10 so that the sleeve 11 may be threaded back and forth easily.

There is an axial bore 22 provided in the front end portion of the body 8 extending approximately to the middle thereof, and this bore is adapted to receive the work gripped between the jaws 23. These jaws are of substantially T-shaped cross section so as to provide opposed longitudinally extending flanges 24 designed to slide with a close working fit in grooves 25 provided in the opposite sides of the bottom of radial guide slots 26 provided in the front end portion 16 of the body in equally circumferentially spaced relation. The jaws 23 are of elongated form and their outer ends 27 are beveled on an arc the radius of which corresponds to the internal radius of the tapered bore 20 in the front end of the sleeve 11. The inner ends 28 of the jaws are beveled off on opposite sides of a middle work gripping face 29 so as to permit closing of the jaws to a very small radius. With this construction, it should be manifest that the jaws 23 will be moved radially inwardly to close on a piece of work when the sleeve 11 is tightened, and a direct radial thrust is transmitted to the jaws for a solid grip on the work, as distinguished from the indirect thrust obtained in other chucks where the jaws are pivoted or fulcrumed intermediate their ends to grip the work at one end and be actuated at the other end. Play is reduced to an absolute minimum, and consequently, the chances for error in the centering of the work are reduced to a minimum. The closest possible concentricity is, of course, assured as a result of the fact that the sleeve 11 is piloted at 17—18 on the front end portion 16 of the body 8 by the pilot flange 19 previously described. Three sets of jaws 23 of different lengths will be provided and the jaws will be changed to suit different diameters, thus, for example, the first set will be made of the longest length to handle work from a minimum size up to 1″ diameter; the second set will be of a shorter length to handle work from 1″ up to the size of the bore 22, and the third set will be provided with outwardly projecting shoulders like those indicated at 30 on the jaws 23′ in Figs. 4 and 5 to fit work of a size larger than the bore 22 and up to any reasonable outside diameter. This chuck, therefore, is of a universal type.

The jaws 23 or 23′, as the case may be, preferably have a slight frictional drag on their sliding movement so that when the chuck is disposed on a horizontal axis, the upper jaw will not be apt to drop down and necessitate the operator moving it back by hand. In Fig. 2 I have therefore indicated small plungers 31 received in bores 32 that are made parallel to the axis of the chuck body and open into the bottom of the radial slots 26, these plungers being spring pressed outwardly under the action of coiled compression springs 33 seated in the bottoms of the small bores. If desired, any suitable means may be provided to limit the extent to which the plungers 31 may be extended from the bores 32 so that when one set of jaws is removed for the substitution of another set, these plungers will not come out and require replacement.

On the other hand, I may provide, as shown in Figs. 4 and 5, a split spring ring 34 entered in transverse grooves 35 provided therefor in the jaws intermediate the ends thereof, the inner ends of the grooves being slightly offset to insure holding the ring in place therein and yet permit easy removal of the ring from the jaws when the jaws are to be removed from the chuck. The split ring 34 preferably has its ends overlapping as shown at 36 in Fig. 6 so that a sufficient range of expansion and contraction is afforded and there is no gap in the ring which might interfere with the smooth sliding of the ring in the jaws in the operation of the chuck.

The sleeve 11 may, if desired, have facets on the periphery to permit tightening the sleeve with a wrench, but I have shown a series of circumferentially spaced radial holes 37 in the rear end portion of the sleeve into which a prong 38 in radially spaced parallel relation to a prong 39 on the end of a key 40 is arranged to be entered, as indicated in dotted lines in Fig. 2, when the prong 39 has been entered in an adjacent keyway 41 provided in the externally threaded portion 9 of the body 8. Four or any other suitable number of keyways 41 may be provided in equally circumferentially spaced relation. With this arrangement, the operator can tighten the sleeve 11 by hand to a desired extent, and then, enter the key in one of the holes 37 which is near enough to one of the keyways 41 so that the key can be entered also in that keyway, whereupon the sleeve can be tightened by a twist of the cross-handle 42 provided on the outer end of the key.

It is believed the foregoing description conveys a good understanding of the objects and advantages of my invention. The appended claims have been drawn to cover all legitimate modifications and adaptations.

I claim:

1. In a chuck, the combination of an integral body having an axial bore provided therein and including in coaxial relation to one another an externally threaded rear portion, a substantially radially slotted and tapered front end portion, and a smooth surfaced cylindrical intermediate pilot portion of smaller radius than said threaded rear portion, work engaging jaws movable substantially radially relative to said bore in said slotted front portion, and an integral sleeve threaded internally in its rear portion for threaded adjustment back and forth relative to the threaded rear portion of said body and having in coaxial relation to the internally threaded portion an internally tapered front end portion corresponding substantially in taper to the front end portion of said body for slidable working engagement on the outer ends of said work engaging jaws, and an intermediate annular internal pilot flange the inner edge of which is smoothly finished for a close working fit on the pilot portion of said body, whereby to maintain said sleeve accurately centered on said body independently of the threaded connection between these parts while shielding said threads from entry of foreign particles in the machining of work held in said jaws.

2. A chuck comprising a threaded body member having work holding jaws slidable relative thereto, and a sleeve threaded on the body and arranged to actuate said jaws to grip the work, said sleeeve having a series of substantially radial holes provided in one end portion in closely circumferentially spaced relation and said body having one or more longitudinally extending grooves provided therein for entry in a hole and groove by a spanner type tool in the turning of said sleeve relative to said body.

3. In combination, a body having an externally threaded portion, and a sleeve threaded internally for threaded adjustment back and forth relative to the threaded portion of said body, said sleeve having a series of substantially radial holes provided in one end portion in closely circumferentially spaced relation and said body having one or more longitudinally extending grooves provided in the adjacent end of the threaded portion thereof for entry by a spanner type tool in the turning of said sleeve relative to said body.

4. In a chuck, the combination of a body having an externally threaded rear portion, and a sleeve threaded internally in its rear portion for threaded adjustment back and forth relative to the threaded rear portion of said body, said sleeve having a series of substantially radial holes provided in the rear end portion in closely circumferentially spaced relation and said body having one or more longitudinally extending grooves provided in the threaded rear portion thereof, said chuck including a tightening key for said sleeve comprising a shank having a relatively long prong and a relatively short prong thereon in radially spaced relationship for entry in a groove and an adjacent hole, respectively.

5. A chuck as set forth in claim 1 including a split spring ring engaged in holes provided in said jaws, extending transversely of the latter, to maintain said jaws in retracted position until moved inwardly by the tightening of said sleeve, the end portions of said split ring forming a sliding lap joint, substantially as and for the purpose described.

6. In a chuck, the combination of an integral body having an axial bore provided therein and including in coaxial relation to one another an externally threaded rear portion, a substantially radially slotted and tapered front end portion, and a smooth surfaced cylindrical intermediate pilot portion of smaller radius than said threaded rear portion, work engaging jaws movable substantially radially relative to said bore in said slotted front portion, and an integral sleeve threaded internally in its rear portion for threaded adjustment back and forth relative to the threaded rear portion of said body and having in coaxial relation to the internally threaded portion an internally tapered front end portion corresponding substantially in taper to the front end portion of said body for slidable working engagement on the outer ends of said work engaging jaws, and an intermediate annular internal pilot flange the inner edge of which is smoothly finished for a close working fit on the pilot portion of said body, whereby to maintain said sleeve accurately centered on said body independently of the threaded connection between these parts while shielding said threads from entry of foreign particles in the machining of work held in said jaws, said jaws having work engaging portions on their inner end portions which project outwardly in directions substantially parallel to the axis of the chuck.

JOSEPH HAMMOND.

REFERENCES CITED

The following references are of record in the file of this patent:

UNITED STATES PATENTS

| Number | Name | Date |
| --- | --- | --- |
| 206,320 | Hayden | July 23, 1879 |
| 400,459 | Ide | Apr. 2, 1889 |
| 1,008,057 | Peck | Nov. 7, 1911 |
| 1,080,727 | Smith et al. | Dec. 9, 1913 |
| 1,159,247 | Morrow | Nov. 2, 1915 |
| 1,392,109 | Bisset | Sept. 27, 1921 |